(12) United States Patent
Gupte et al.

(10) Patent No.: US 10,423,414 B2
(45) Date of Patent: Sep. 24, 2019

(54) PARALLEL PROCESSING IN HARDWARE ACCELERATORS COMMUNICABLY COUPLED WITH A PROCESSOR

(71) Applicant: TEXAS INSTRUMENTS INCORPORATED, Dallas, TX (US)

(72) Inventors: Ajit Deepak Gupte, Bangalore (IN); Mahesh Mehendale, Bangalore (IN); Navin Acharya, Bangalore (IN); Mel Alan Phipps, Sugar Land, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 18 days.

(21) Appl. No.: 14/539,674

(22) Filed: Nov. 12, 2014

(65) Prior Publication Data

US 2016/0132329 A1 May 12, 2016

(51) Int. Cl.
*G06F 9/30* (2018.01)
*G06F 9/48* (2006.01)
*G06F 9/38* (2018.01)
*G06T 1/20* (2006.01)

(52) U.S. Cl.
CPC ........ *G06F 9/30036* (2013.01); *G06F 9/3851* (2013.01); *G06F 9/4887* (2013.01); *G06T 1/20* (2013.01)

(58) Field of Classification Search
CPC .. G06F 9/30036; G06F 9/3851; G06F 9/4887; G06T 1/20
See application file for complete search history.

(56) References Cited

U.S. PATENT DOCUMENTS

| 6,513,057 | B1 * | 1/2003 | McCrory | G06F 9/4881 710/6 |
| 7,634,637 | B1 * | 12/2009 | Lindholm | G06F 9/3851 712/13 |
| 2011/0022817 | A1 * | 1/2011 | Gaster | G06F 9/5044 711/202 |
| 2011/0115802 | A1 * | 5/2011 | Mantor | G06F 9/5027 345/520 |
| 2011/0131580 | A1 * | 6/2011 | Krishnamurthy | G06F 9/5038 718/102 |
| 2013/0114704 | A1 * | 5/2013 | Chen | H04N 19/56 375/240.12 |

* cited by examiner

*Primary Examiner* — S. Sough
*Assistant Examiner* — Timothy P Duncan
(74) *Attorney, Agent, or Firm* — Brian D. Graham; Charles A. Brill; Frank D. Cimino (57) ABSTRACT

In an embodiment, a device including a processor, a plurality of hardware accelerator engines and a hardware scheduler is disclosed. The processor is configured to schedule an execution of a plurality of instruction threads, where each instruction thread includes a plurality of instructions associated with an execution sequence. The plurality of hardware accelerator engines performs the scheduled execution of the plurality of instruction threads. The hardware scheduler is configured to control the scheduled execution such that each hardware accelerator engine is configured to execute a corresponding instruction and the plurality of instructions are executed by the plurality of hardware accelerator engines in a sequential manner. The plurality of instruction threads are executed by plurality of hardware accelerator engines in a parallel manner based on the execution sequence and an availability status of each of the plurality of hardware accelerator engines.

18 Claims, 4 Drawing Sheets

PARALLEL PROCESSING IN HARDWARE ACCELERATORS COMMUNICABLY COUPLED WITH A PROCESSOR

TECHNICAL FIELD

The present disclosure relates to methods and systems for parallel processing in hardware accelerators that are communicably coupled with a processor.

BACKGROUND

In accordance with an example scenario, data-centric applications, such as, for example, data communication, image processing, complex mathematical and logical computations, has increased the amount of data processed by a processor in electronic devices. The performance of the processor is based on the instructions per second that the processor is able to perform. Such computationally intensive applications consume a relatively large amount of time and power of the processor, which affects other native operations performed by the processor. Although processing performance is enhanced by employing multi-core processors (for example, two or more processors working together jointly), it is noted that the performance gain of the multi-core processors decreases substantially. Alternatively, in order to increase the performance of such devices, the computationally intensive operations are performed by separate hardware accelerators that operate with the processor. However, effective utilization of the hardware accelerators by the processor in executing the computationally intensive applications is a challenge.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

In an embodiment, a device for parallel processing includes a processor, a plurality of hardware accelerator engines and a hardware scheduler. The processor is configured to schedule an execution of a plurality of instruction threads. Each instruction thread of the plurality of instruction threads includes a plurality of instructions. The plurality of instructions is associated with an execution sequence. The plurality of hardware accelerator engines is configured to perform the scheduled execution of the plurality of instruction threads. The hardware scheduler is communicatively coupled with the processor and the plurality of hardware accelerator engines. The hardware scheduler is configured to control the scheduled execution such that each hardware accelerator engine from among the plurality of hardware accelerator engines is configured to execute a corresponding instruction from among the plurality of instructions. The plurality of instructions are executed by the plurality of hardware accelerator engines in a sequential manner. The plurality of instruction threads are executed by the plurality of hardware accelerator engines in a parallel manner based on the execution sequence and an availability status of each of the plurality of hardware accelerator engines.

In an embodiment, a method for parallel processing includes accessing an executable algorithm by a processor. The method further includes identifying a plurality of instruction threads in the executable algorithm by a processor, where each instruction thread of the plurality of instruction threads includes a plurality of instructions. In an embodiment, the plurality of instructions are associated with an execution sequence. The method also includes scheduling, with the processor, the plurality of instruction threads to be executed by a plurality of hardware accelerator engines. In an embodiment, each instruction thread of the plurality of instruction threads is scheduled is performed by the plurality of hardware accelerator engines in a sequential manner. In an embodiment, each instruction from among the plurality of instructions is executed by a corresponding hardware accelerator engine from among the plurality of hardware accelerator engines. The plurality of instructions threads are performed by the plurality of hardware accelerator engines in a parallel manner based on the execution sequence of the plurality of instructions and an availability status of each of the plurality of hardware accelerator engines.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to 'one embodiment' or 'an embodiment' means that a particular feature, structure, or characteristic described in connection with the embodiment is included in at least one embodiment of the present technology. The appearance of the phrase 'in one embodiment' or 'in an embodiment' in various places in the specification are not necessarily all referring to the same embodiment, nor are separate or alternative embodiments mutually exclusive of other embodiments. Moreover, various features are described which are exhibited by some embodiments and not by others. Similarly, various requirements are described which are requirements for some embodiments but not for other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

Pursuant to an example scenario, a processor, for example a central processing unit (CPU), executes instructions by accessing data from a memory embodied in the processor or otherwise accessible to the processor. In a case, where the instructions involve intensive computations, for example, pixel matching between media frames or coding a sequence of frames in motion estimation for a lossless compression, the performance of the processor degrades. In such cases, the instructions that involve exhaustive computation, such as complex arithmetic operations on floating point data for pixel matching are executed by another processor, such as a hardware accelerator. The hardware accelerator is communicatively associated with the processor and is configured to perform specialized functions. Various embodiments of the present technology are capable of running independent sequences of algorithm in parallel in a plurality of hardware accelerators. Various embodiments of the present technology are herein disclosed in conjunction with FIGS. 1-6.

Figure 1:
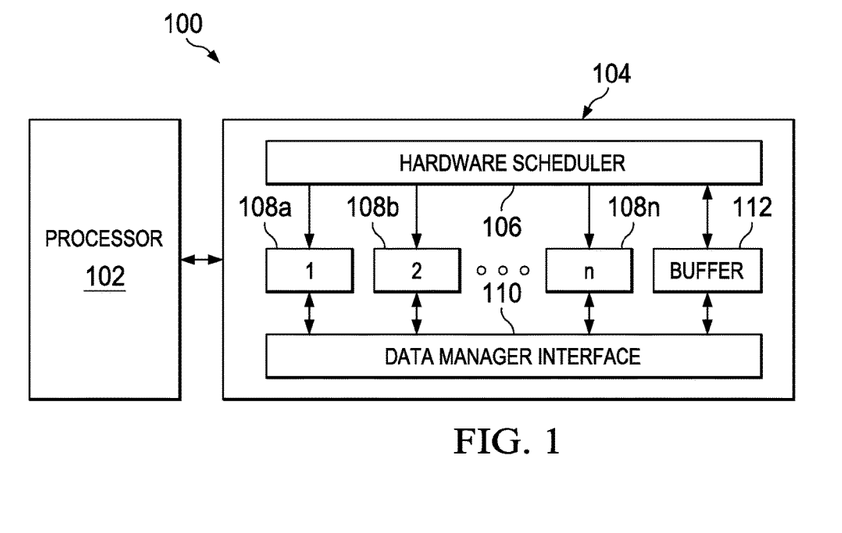
FIG. 1 is a block diagram of an example device including a processor and hardware accelerator engines according to an embodiment.

Referring to FIG. 1, a device 100 including a processor 102 and a data processing system 104 communicatively associated with the processor 102 is shown, according to an embodiment of the present technology. An example of the processor 102 is a microprocessor, a digital signal processor, a central processing unit or an application specific instruction set processor. The data processing system 104 is operable to perform computationally intensive tasks to aid the processor 102. In various implementations, the data processing system 104 is configured to perform specialized functions. For instance, without loss of generality, the data processing system 104 is designed to execute the specialized functions that are computationally intensive such as Fast Fourier Transform (FFT), floating point arithmetic, motion estimation of objects between media frames, video compression, and the like. For example, in executing instructions associated with a binary search algorithm for block matching in video compression (for example, blocks having resolutions of 1024×768 pixels), the complexity in finding a matching block for a given block is $\log_2(N)$, where N is the number of pixels. In some implementations, such computationally intensive tasks are allocated to the data processing system 104 by the processor 102, and the processor 102 continues executing native instructions.

In an embodiment, the processor 102 is configured to receive a plurality of instructions associated with execution of an algorithm. In an embodiment, the processor 102 is configured to create a plurality of instruction threads from the plurality of instructions based on parallelism present in the algorithm. Herein, the parallelism in the algorithm refers to a plurality of independent sequences of instructions (also referred to as 'the plurality of instruction threads') that are executed in parallel. For example, the plurality of instruction threads are executed in parallel in the data processing system 104.

In an example embodiment, the processor 102 is configured to schedule an execution of the plurality of instruction threads to be executed by the data processing system 104. The data processing system 104 includes a hardware scheduler 106 and a plurality of hardware accelerator engines (108a-108n). In an example embodiment, the hardware scheduler 106 is communicatively with the processor 102 and the plurality of hardware accelerator engines (108a-108n). In an example embodiment, the hardware scheduler 106 is configured to control the scheduled execution of the plurality of instructions threads (that are scheduled by the processor 102). The hardware scheduler 106 sequences the plurality of instructions in an instruction thread to be executed in the hardware accelerator engines (108a-108n) based on the scheduling of the processor 102.

In an example embodiment, each hardware accelerator engine of the hardware accelerator engines (108a-108n) is configured to perform specific one or more instructions of an algorithm. For example, it is assumed that there are four instructions in a motion estimation algorithm between two or more frames, for example search for a predictor vector and determination of an associated Sum of Absolute Difference (SAD) (predicting matching set of pixels of one frame into another frame); a vector search and determination of an associated SAD (finding second level of matching pixels based on the predicted set of pixels); sub pixel search and determination of an associated SAD (determined a refined set of matching pixels) and a skip operation. In an example embodiment, each instruction from among the plurality of instructions is executed in at least one hardware accelerator engine of the hardware accelerator engines (108a-108n). In this example, a hardware accelerator engine 108a (also referred to as a 'predictor engine') is operable to execute instructions related to searching for the predictor vector and determination of the associated SAD; a hardware accelerator engine 108b (also referred to as a 'vector engine') is operable to execute instructions related to vector search and determination of the associated SAD. Similarly, a hardware accelerator engine 108c (also referred to as a 'sub pixel engine') is operable to execute instructions related to sub pixel search and determination of the associated SAD and a hardware accelerator engine 108d (also referred to as a 'skip engine') is operable to execute instructions related to skip operations.

In various embodiments of the present technology, a set of operations for the motion estimation is performed for a base frame and two frames (for example, between the base frame and a first frame and between the base frame and a second frame) in a parallel manner. For instance, the processor 102 receives instructions associated with the algorithm to run the motion estimation algorithm (for example, to determine motion vectors) associated with the base frame with each of the first frame and the second frame. The processor 102 creates a first instruction thread (L1) to determine a first motion vector between the base frame and the first frame and creates a second instruction thread (L2) to determine a second motion vector between the base frame and the second frame, where each of the instruction threads L1 and L2 includes four instructions, such as the predictor search, the vector search, the sub pixel search and the skip operation. It should be noted that the four instructions are herein provided in each of the L1 and L2 for merely example purposes, and instruction threads L1 and L2 include same or different number of instructions.

In an example embodiment, the instructions threads L1 and L2 are performed by the hardware accelerator engines (108a-108n) in a parallel manner, where each of the instruction threads L1 or L2 is performed individually in a sequential manner by the hardware accelerator engines (108a-108n). The execution of the instructions in an instruction thread, such as the instruction thread L1 is based on an execution sequence. The execution sequence of the instruction thread L1 is determined based on an algorithm dependency. For example, if the instruction thread L1 executes instructions associated with determining the motion vector for the base frame associated with the first frame, the instruction thread L1 includes instructions to perform the predictor search, the vector search and the sub pixel search. The instructions are executed in the sequential manner based on the algorithm dependency. For example, to execute the instruction associated with the sub pixel search requires an output of the execution of the instruction associated with the vector search. In this example, the instruction associated with the predictor search is executed followed by the execution of the instruction associated with the vector search and then the execution of the instruction associated with the sub pixel search. It should be noted that the hardware accelerator engines (108a-108n) do not perform the execution of the instruction associated with the vector search and the instruction associated with the sub pixel search of the instruction thread L1 in parallel due to the execution sequence associated with the algorithm dependency. Similarly, the instructions of the instruction thread L2 are performed in the sequential manner based on the algorithm dependency.

In an embodiment, the hardware accelerator engines (108a-108n) are shared by the plurality of instruction threads (such as L1 and L2) and the availability status of a hardware acceleration engine (for example, 108a, 108b or 108c) is determined based on the fact that whether the hardware acceleration engine is busy in executing corresponding instruction or not. In an embodiment, availability status of the hardware accelerator engine includes a free status and a busy status. In an embodiment, a status between a time instant (for example, a start time) at which a hardware accelerator engine starts execution of an instruction and a time instant (a completion time) at which the execution of the instruction is completed, the availability status of the hardware acceleration engine is the busy status, and otherwise the availability status is the free status. In an embodiment, the availability status also depends upon availability status of one or more of a buffer, an external memory, interfaces and input/output ports.

In an embodiment, the plurality of instruction threads are performed in a parallel manner by the hardware accelerator engines (108a-108n) based on the execution sequence of the plurality of instructions in each of the instruction thread and availability status of the hardware accelerator engines (108a-108n). For example, the instruction associated with the sub pixel search in the instruction thread L1 is executed in parallel with the instruction associated with the vector search in the instruction thread L2. The instruction associated with the sub pixel search in the instruction thread L1 is executed in the sub pixel engine and at the same time instant the instruction associated with the vector search in the instruction thread L2 is executed in the vector engine based on their availability status.

In an embodiment, the processor 102 receives information associated with execution of each instruction of the plurality of instructions. For example, the processor 102 receives information associated with each of a time taken to fetch data for an instruction, a time needed by a hardware engine to execute the instruction, resources needed for execution of the instruction, execution sequence of instructions in the plurality of instruction threads and time required for accessing resources associated with the execution of that instruction. The processor 102 computes execution time associated with the execution of each instruction of the plurality of instructions based on the information received by the processor 102. In an example embodiment, the processor 102 schedules the plurality of instruction threads in the hardware accelerator engines (108a-108n) based on the execution time, such that conflicts in the execution of the plurality of instruction threads in the plurality of hardware accelerator engines (108a-108n) are avoided.

In an embodiment, the device 100 also includes a data manager interface 110 and a buffer 112. The data manager interface 110 is communicatively associated with the hardware accelerator engines (108a-108n) and is configured to receive output data from the hardware accelerator engines (108a-108n) after executing the instructions, and store the output data in the buffer 112. In an example embodiment, the data manager interface 110 merges the output data associated with the plurality of instruction threads that were executed in parallel.

In some example embodiments, the data manager interface 110 sends timing information associated with execution of instructions of instruction threads to the processor 102. For instance, as the availability status of a hardware accelerator engine changes from the busy status to the free status (which also signifies a completion of the execution of the corresponding instruction by the hardware accelerator engine), the processor 102 is notified of the free status of the hardware accelerator engine. In an example embodiment, the processor 102 utilizes the timing information associated with the execution of an instruction in an instruction thread to reschedule at least one instruction (for example, subsequent instructions in the instruction thread or the same instruction in other instruction threads). The rescheduling of the at least one instruction of the plurality of instruction threads by the processor 102, reduces a total execution time of the plurality of instruction threads and thereby optimizing the scheduling/execution of the plurality of instruction threads. In some embodiments, the processor 102 is operable to provide the timing information to the hardware scheduler 106, such that the hardware scheduler 106 controls execution of the rescheduled plurality of instructions.

In an example embodiment, the data manager interface 110 determines the availability status of the hardware accelerator engines (108a-108n) and the buffer 112 for executing the plurality of instruction threads. The buffer 112 is communicatively associated with the hardware scheduler 106 and the data manager interface 110. In an example embodiment, the buffer 112 provides data to the hardware accelerator engines (108a-108n) for executing the plurality of instruction threads. The output data obtained after executing the plurality of instruction threads is stored in the buffer 112.

Figure 2:
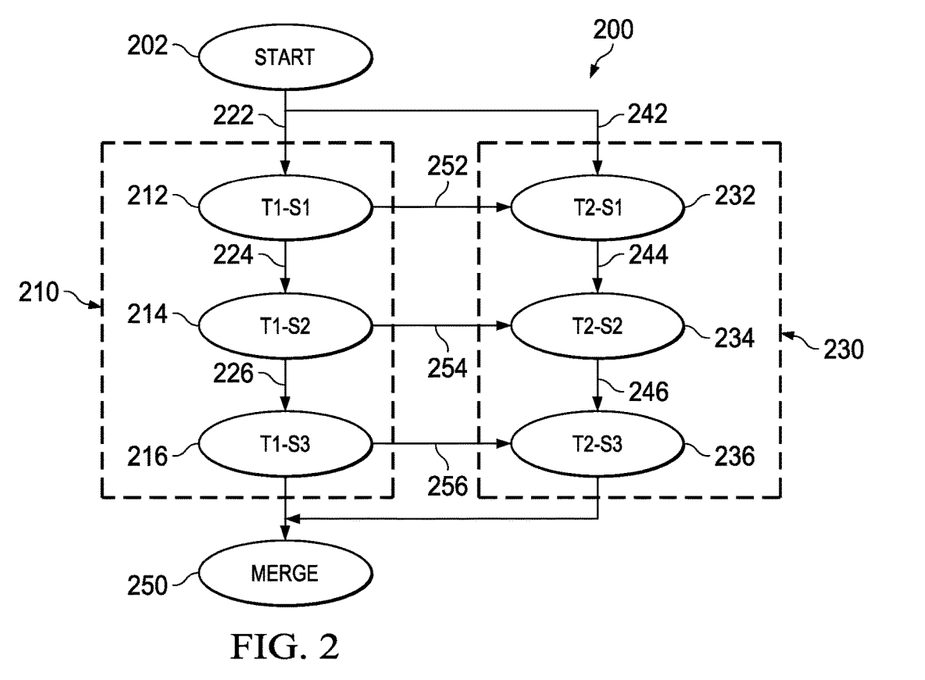
FIG. 2 illustrates an example parallel execution of two instruction threads according to an embodiment.

FIG. 2 illustrates a process 200 for execution of two instruction threads in parallel by a plurality of hardware accelerator engines. Without loss of generality, in an example, the process 200 relates to motion estimation between media frames. The process 200 is executed on a device, such as the device 100. For the purposes of the description of the process 200, references have been made to the device 100 as described with reference to FIG. 1. In FIG. 2, $m^{th}$ instruction in $n^{th}$ instruction thread is represented by 'Tn-Sm'. For example, there are three instructions (S1, S2 and S3) in each of the instruction threads (T1 and T2), so accordingly, T1-S1 denotes instruction S1 of the instruction thread T1, and so on. In an embodiment, the processor 102 is configured to create the instruction threads T1 and T2 such that each of the instruction threads T1 and T2 include the instructions (S1, S2 and S3). In an example embodiment, it should be noted that an instruction that is present in both of the instruction threads (T1 and T2) is executed by a same hardware accelerator engine. For example, instruction S1 of the instruction thread T1 (shown as T1-S1) is scheduled to be executed in a first hardware accelerator engine, instruction S2 of the instruction thread T1 (shown as T1-S2) is scheduled to be executed in a second hardware accelerator engine and instruction S3 of the instruction thread T1 (shown as T1-S3) is scheduled to be executed in a third hardware accelerator engine. Similarly, instruction S1 of the instruction thread T2 (shown as T2-S1) is scheduled to be executed by the first hardware accelerator engine, instruction S2 of the instruction thread T2 (shown as T2-S2) is scheduled to be executed by the second hardware accelerator engine and instruction S3 of the instruction thread T2 (shown as T2-S3) is scheduled to be executed by the third hardware accelerator engine.

In an example, such as the motion estimation, the instruction S1 is assumed to be associated with predictor search, the instruction S2 is assumed to be associated with vector search and the instruction S3 is assumed to be associated with sub pixel search. It should be noted that arrows 222, 224 and 226 represent an execution sequence of the instructions (S1, S2 and S3) of the instruction thread T1 (shown as, 210) and arrows 242, 244 and 246 represent an execution sequence of the instructions (S1, S2 and S3) of the instruction thread T2 (shown as, 230). For example, the instruction S2 of the instruction thread T1 is be initiated only after the instruction S1 of the instruction thread T1 is completed. The arrows 252, 254 and 256 represent a resource dependency of the instruction thread T2, for example the availability status of the first hardware accelerator engine, the second hardware accelerator engine and the third hardware accelerator engine, for execution of operations associated with the instructions (S1, S2 and S3) of the instruction thread T2.

In an example, the device 100 initiates the data processing system 104 to start (shown by block 202) execution of the instruction threads T1 and T2. In an example embodiment, the instruction threads T1 and the T2 are scheduled to be executed in parallel by the processor 102. In the example of the motion estimation, the instruction thread T1 includes instructions to determine a first motion vector between a base frame (Fb) and a first frame (F1), and the instruction thread T2 includes instructions to determine a second motion vector between the base frame (Fb) and a second frame (F2, that is other than the first frame F1). In an example, a frame (for example, the base frame, the first frame F1 and the second frame F2) includes a plurality of pixel blocks and determination of motion vector herein includes a plurality of search operations to determine matching pixel blocks in the frames F1 and the F2 corresponding to the pixel blocks in the base frame Fb. In an embodiment, arrows, such as the arrow 252 shows the resource dependency of the instruction (S1) in the instruction thread T2 on the instruction (S1) of the instruction thread T1. For instance, the instruction T2-S1 needs to be executed by the first hardware accelerator engine that is also required for the execution of the instruction T1-S1 of the instruction thread T1. For example, the instruction T2-S1 (the predictor vector search in the frame F2 for the frame F1) in the instruction thread T2 is executed by the first hardware accelerator engine after the first hardware accelerator completes the execution of the instruction T1-S1 (predictor vector search in the frame R1 for the frame F1) in the instruction thread T1.

In an example embodiment, the instruction thread T1 includes the instructions S1, S2 and S3 for determining a first motion vector for pixel block P1 of the base frame Fb in the first frame F1, and the instruction thread T2 includes the instructions S1, S2 and S3 for determining a second motion vector for the pixel block P1 of the base frame Fb in the second frame F2. At block 212, the process 200 includes execution of the instruction T1-S1. The instruction T1-S1 performs the predictor search for the pixel block P1 of the base frame Fb in the first frame F1. The instruction T1-S1 is executed in the first hardware accelerator engine. In an embodiment, output of T1-S1 is needed for the execution of the instruction T1-S2. At block 214, the process 200 includes execution of the instruction T1-S2 for performing vector search operations based on the output of the predictor search associated with the instruction T1-S1. The instruction T1-S2 is executed in the second hardware accelerator engine.

At block 216, the process 200 includes execution of the instruction T1-S3 for performing the sub pixel search to determine the first motion vector for the pixel block P1 between the base frame Fb and the first frame F1 based on an output associated with the executed instruction T1-S2 by the second hardware accelerator engine. It should be noted that the instruction T1-S3 is executed only after the execution of the instruction T1-S2 is complete. The instruction T1-S3 that performs the sub pixel search is executed in the third hardware accelerator engine.

At block 232, the process 200 includes execution of the instruction T2-S1 for performing the predictor search for the pixel block P1 of the base frame Fb in the second frame F2. The instruction T2-S1 is executed in the first hardware accelerator engine. At block 234, the process 200 includes execution of the instruction T2-S2 for performing the vector search operations based on the output of the predictor search (obtained by execution of the instruction T2-S1). The instruction T2-S2 is executed in the second hardware accelerator engine. At block 236, the process 200 includes execution of the instruction T2-S3 for performing the sub pixel search operations to determine the second motion vector for the pixel block P1 between the base frame Fb and the second frame F2. It should be noted that instruction T2-S3 is executed only after the execution of the instruction T2-S2 is complete. The instruction T2-S3 that performs the sub pixel search is executed in the third hardware accelerator engine.

It should be noted that although the instruction threads T1 and T2 are independent, the instruction threads T1 and T2 share resources, such as the first hardware accelerator engine, the second hardware accelerator engine and the third hardware accelerator engine to execute the instructions S1, S2 and S3, respectively. The instructions T1-S1 and T2-S1 perform the predictor search in the first hardware accelerator engine. It should be noted that the engines (the first hardware accelerator engine, the second hardware accelerator engine and the third hardware accelerator engine) execute their corresponding instructions of only one instruction thread T1 or T2, at a given time instant. Accordingly, the instruction T2-S1 is executed by the first hardware accelerator engine only after the execution of the instruction T1-S1. The hardware scheduler 106 initiates the instruction T2-S1 only after execution of the instruction T1-S1. Further, it should be noted that the instruction threads T1 and T2 are performed in parallel manner, as the blocks 214 and 232 are performed simultaneously, and the blocks 216 and 234 are performed simultaneously. A timing diagram for the scheduling/execution of the instruction threads T1 and T2 is further explained with reference to FIG. 3.

Figure 3:
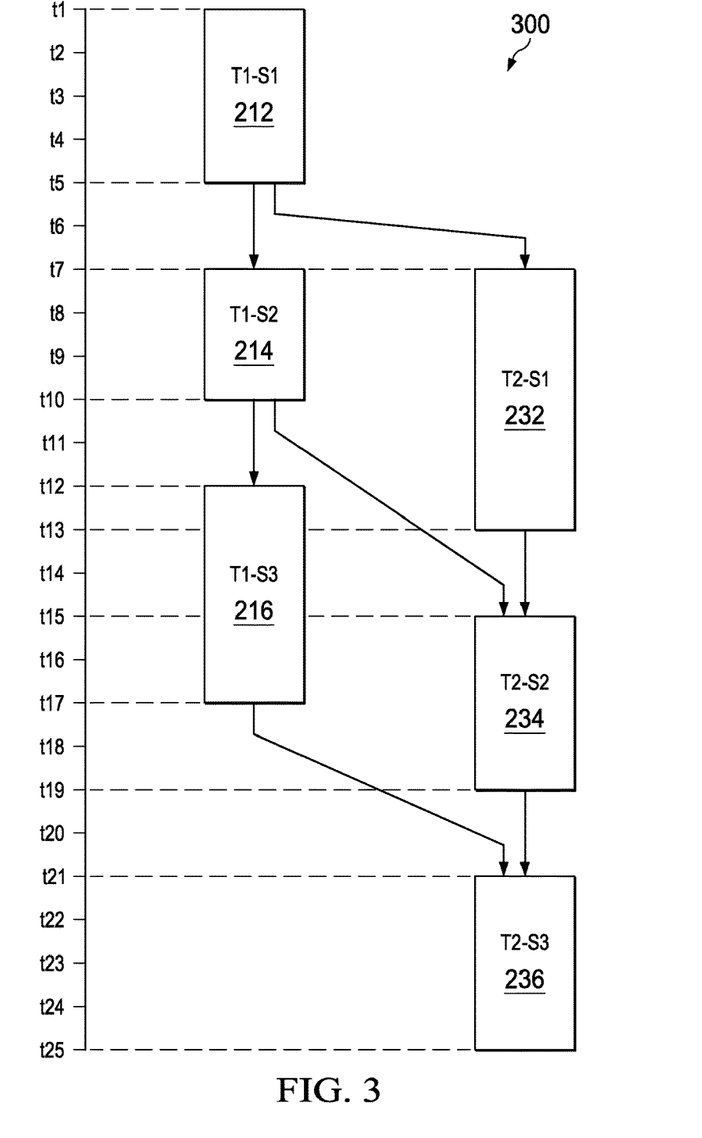
FIG. 3 illustrates a first example timing diagram for parallel scheduling of two instruction threads according to an embodiment.

FIG. 3 illustrates a timing diagram 300 that shows parallel scheduling of two instruction threads T1 and T2 according to an embodiment. The timing diagram 300 of FIG. 3 is herein described for the process 200 as described in reference to FIG. 2. A processor, such as the processor 102, receives information associated with execution time of each instruction of the plurality of instructions and the processor 102 schedules the plurality of instructions in the plurality of hardware accelerator engines (for example, 108a-108n)

based on the information. The processor 102 determines a number of time cycles for execution of each instruction of the instructions (S1, S2 and S3) of the instruction threads T1 and T2 and schedules the instructions (S1, S2 and S3) of the instruction threads T1 and T2 accordingly in the first hardware accelerator engine, second hardware accelerator engine and the third hardware accelerator engine, respectively.

In the example representation of FIG. 3, at a time instance 't1', the first hardware accelerator engine starts execution of the instruction T1-S1 (shown by the block 212) of the instruction thread T1 as scheduled by the processor 102. The processor 102 determines that the instruction T1-S1 requires 4 cycles to execute the instruction T1-S1. As shown in the example representation of FIG. 3, the first hardware accelerator engine takes 4 cycles to execute the instruction T1-S1. At time instance 't5', the first hardware accelerator engine completes the execution of the instruction T1-S1. Although, the instruction T1-S2 (shown by the block 214) of the instruction thread T1 is executed on the second hardware accelerator engine, it cannot be executed since the execution of the instruction T1-S2 depends on output of execution of the instruction T1-S1 (for example, due to algorithm dependency). Further, the execution of the instruction T2-S1 (shown by the block 232) does not depend on output of the execution of the instruction T1-S1, but T2-S1 is also not executed in parallel with the instruction T1-S1 as the instruction T2-S1 is executed once the first hardware accelerator engine is free.

After the completion of the execution of the instruction T1-S1, at a time instance 't7', the instruction T1-S2 and the instruction T2-S1 are initiated to be executed in the second hardware accelerator engine and the first hardware accelerator engine, respectively. It should be noted that the execution of the T1-S2 and T2-S1 also start at a time instance 't6' in some implementations. In this example representation, it is assumed that the processor 102 allocates 3 cycles for the execution of the instruction T1-S2 (shown by the block 214) in the second hardware accelerator engine and 6 cycles for the execution of the instruction T2-S1 (shown by the block 232) in the first hardware accelerator engine. At time instance 't10', the second hardware accelerator engine completes execution of the instruction T1-S2 but the first hardware accelerator engine is still executing the instruction T2-S1. At time instance 't12', the third hardware accelerator engine starts executing the instruction T1-S3 (shown by the block 216) as scheduled by the processor 102. The instruction T1-S3 uses output of the instruction T1-S2 to execute the instruction T1-S3. As shown in the FIG. 3, the first hardware accelerator engine completes execution of the instruction T2-S1 at a time instance 't13' in 6 cycles as allocated by the processor 102. In the example shown in FIG. 3, 5 cycles are allotted for the third hardware accelerator engine, 6 cycles for the first hardware accelerator engine and 4 cycles for the second hardware accelerator engine for the execution of the instructions T1-S3, T2-S1 and T2-S2, respectively, based on the execution sequence of the instructions (S1, S2 and S3) in the instruction threads T1 and T2.

At a time instance 't15', the second hardware accelerator engine starts execution of the instruction T2-S2 (shown by the block 234) in parallel with the execution of the instruction T1-S3 by the third hardware accelerator engine. It should be noted that if there is a third instruction thread T3 present in the algorithm, the first hardware accelerator engine is free to execute an instruction S1 of the instruction thread T3 (after completing the execution of the instruction T2-S1 at time instance 't13') in parallel with the instructions T1-S3 and T2-S2. At a time instance 't17', the third hardware accelerator engine completes execution of the instruction T1-S3, and becomes available to execute the instruction T2-S3. Although, the third hardware accelerator engine is available for execution of the instruction T2-S3 (shown by the block 236), the instruction T2-S3 is not executed since the instruction T2-S3 depends on output of the execution of the instruction T2-S2. Such dependency on output is referred to as the execution sequence of instructions in an instruction thread or algorithm dependency. At time instance 't19', the second hardware accelerator engine completes execution of the instruction T2-S2 and output of the instruction T2-S2 is available for the execution of the instruction T2-S3.

After the completion of the execution of the instruction T2-S2, at time instance 't21', the third hardware accelerator engine starts execution of the instruction T2-S3 as scheduled by the processor 102 for the next 4 cycles. It should be noted that the other instructions (T1-S1, T1-S2, T1-S3, T2-S1 and T2-S2) in the instruction threads T1 and T2 have completed execution and the first hardware accelerator engine and the second hardware accelerator engine remain idle during next 4 clock cycles. At time instance 't25', the third hardware accelerator engine completes execution of the instruction T2-S3 as scheduled by the processor 102.

Figure 4:
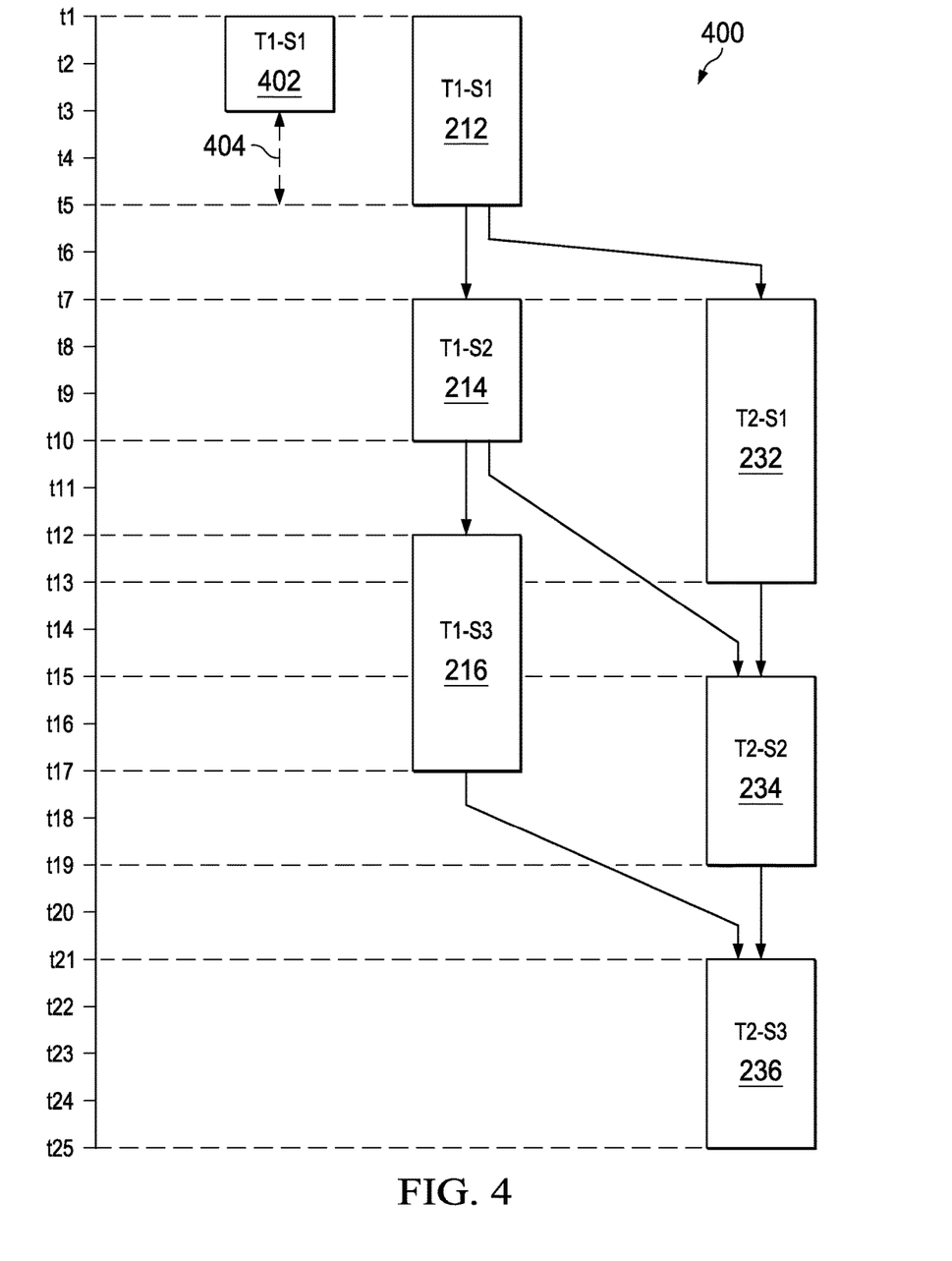
FIG. 4 illustrates a second example timing diagram for parallel scheduling of two instruction threads according to an embodiment.

FIG. 4 illustrates a timing diagram 400 that represents scheduling of two instruction threads T1 and T2 in parallel, according to one embodiment. The timing diagram 400 is herein described for the process 200 as described with reference to FIG. 2. If a hardware accelerator engine, such as the first hardware accelerator engine completes execution of an instruction (for example, T1-S1) earlier than number of cycles allotted by the processor 102, the hardware accelerator engine remains idle for the remaining number of cycles allotted by the processor 102. For example, if the instruction T1-S1 (shown by block 402) is executed in 2 cycles (for example, between time instances 't1-t3') that is less than the 4 cycles (see, 212) initially scheduled by the processor 102. In such a scenario, the first hardware accelerator engine remains idle for 2 cycles (see, 404). Although, the second hardware accelerator engine receives output of the instruction T1-S1 from the first hardware accelerator engine, the second hardware accelerator engine starts execution of the instruction T1-S2 at a time instance 't7' as scheduled by the processor 102. It should be noted that in the embodiment described with reference to FIG. 3, the first hardware accelerator engine waits until the next instruction scheduled by the processor 102, is initiated for execution in the first hardware accelerator engine.

In an embodiment, if an instruction such as T1-S1 is executed earlier than the scheduled cycles, the subsequent instructions are initiated without wasting one or more cycles that are freed up to enhance the performance of the device, such as the device 100. In an embodiment, the processor 102 is configured to receive timing information associated with the execution of each instruction of an instruction thread, through the data manager interface 110. For example, the processor receives timing information associated with executing the instruction S1 of the instruction thread T1 in the first hardware accelerator engine. In an embodiment, the processor 102 receives timing information from the hardware accelerator engines, such as the first hardware accelerator engine, second hardware accelerator engine and the third hardware accelerator engine, through the data manager interface 110. The timing information includes a start time and a completion time associated with the execution of the instruction, such as the instruction T1-S1 by the first hardware accelerator engine. For example, the processor 102 receives information when an instruction (for example, T1-S1) starts execution in the first hardware accelerator engine and the time instance at which the first hardware engine completes execution of the instruction T1-S1. The timing information helps the processor 102 in re-scheduling the remaining instructions of the instruction threads T1 and T2 if an instruction in the instruction thread completes execution earlier than the allocated number of cycles.

In an embodiment, the availability status of the engine, such as the first hardware engine includes a free status upon the completion event and includes a busy status between the start time and the completion time. For instance, the first hardware accelerator engine starts executing the instruction T1-S1 at time instance 't1', the first hardware accelerator engine sends information of the start time to the processor 102. The first hardware accelerator engine remains in the busy status when the instruction T1-S1 is being executed. In an example, if the instruction T1-S1 (shown by the block 402) completes execution in 2 cycles (as opposed to the 4 cycles allocated by the processor 102 for execution of the instruction T1-S1 by the first hardware accelerator engine), the first hardware accelerator engine sends an information of the completion time to the processor 102. The processor 102 determines that the first hardware accelerator engine is in the free status and is ready to execute the next instruction T2-S1 of the instruction thread T2. An instruction, such as the predictor search in the motion estimation, completes in less number of cycles as initially scheduled by the processor 102. For instance, it is assumed that the processor 102 allots 'n' number of cycles for the predictor search based on the probable maximum iterations to obtain the predictor vector for the frame that gives a minimal error. In a scenario, if the first hardware accelerator engine finds a suitable predictor vector (predictor vector that gives minimal error) in a second cycle (as opposed to scheduled 'n' cycles, where 'n' is a natural number greater than 2), the first hardware accelerator engine provides the predictor vector as output of the predictor search instruction. In an example embodiment, execution sequence of an algorithm having two independent threads T1 and T2, each having instructions (S1, S2 and S3), represented by the following sequence:

Start T1-S1;
Wait for T1-S1 to complete;
Start T1-S2 and Start T2-S1;
Wait for T1-S2 to complete;
Start T1-S3;
Wait for T2-S1 to complete;
Start T2-S2;
Wait for T2-S2 to complete;
Wait for T1-S3 to complete;
Start T2-S3.

The processor 102 schedules the instruction T1-S1 in the first hardware accelerator engine, and the first hardware accelerator engine sends a start event to the processor 102 indicating that the first hardware accelerator engine is in the busy status executing the instruction T1-S1. The instructions T1-S2 and T2-S1 wait for the instruction T1-S1 to be executed in the first hardware accelerator engine. The execution of the instruction T1-S2 depends on the completion of the T1-S1 (due to execution sequence as per the algorithm dependency) and the execution of the instruction T2-S1 requires the first hardware acceleration engine to be in the free status after completing the execution of the T1-S1. As the first hardware accelerator engine completes the execution of the instruction T1-S1, the first hardware accelerator engine sends the completion event to the processor 102 indicating that the first hardware accelerator engine is in the free status to execute another instruction. In so much, as the timing information (completion event/time of the instruction T1-S1) is sent to the processor 102 and if the instruction T1-S1 is executed earlier than the scheduled number of cycles, the processor 102 reschedules the next instructions T1-S2 or T2-S1 earlier than the initial scheduling of the instructions T1-S2 or T2-S1, thereby saving one or more cycles that would have otherwise been wasted as per the one or more embodiments of FIG. 3.

In an embodiment, the processor 102 reschedules the execution of other instructions (T1-S2, T2-S1, T1-S3, T2-S2 and T2-S3) and optimizes the execution time associated with execution of the instructions (S1, S2 and S3) in the instruction threads T1 and T2. For example, the processor 102 schedules the instruction T1-S2 to be executed in the second hardware accelerator engine and the instruction T2-S1 in the first hardware accelerator engine, based on the reception of the completion event of the instruction T1-S1 from the first hardware accelerator engine. In an embodiment, the processor 102 waits for the completion event from the second hardware accelerator engine that executes the instruction T1-S2. The processor 102 schedules the instruction T1-S3 in the third hardware accelerator engine after it receives the completion event from the second hardware accelerator engine executing the instruction T1-S2. The processor 102 further determines whether the first hardware accelerator engine has completed the execution of the instruction T2-S1 and schedules the instruction T2-S2 in the second hardware accelerator engine according to the execution sequence. In some cases, although, the second hardware accelerator engine is in the free status to execute the instruction T2-S2 after the execution of the instruction T1-S2, but still the instruction T2-S2 waits for the completion of the execution of the instruction T2-S1 as per the algorithm dependency.

In an example embodiment, the processor 102 is configured to wait until the reception of the completion event from the second hardware accelerator engine executing the instruction T2-S2 and then determine whether the third hardware accelerator engine has completed the execution of the instruction T1-S3. The instruction T2-S3 waits for the instruction T2-S2 to be executed, since the instruction T2-S3 is sequenced after the execution of the instruction T2-S2. The instruction T2-S3 is executed by the third hardware accelerator engine, as the third hardware accelerator engine is in the free status upon completion of the execution of the instruction T1-S3 by the third hardware accelerator engine. In an example embodiment, the processor 102 waits for the completion event of the instructions T1-S3 and T2-S2 and then initiates execution of the instruction T2-S3 in the third hardware accelerator engine. The third hardware accelerator engine sends a completion event to the processor 102 after executing the instruction T2-S3.

In another example embodiment, the processor 102 is configured to further optimize the time (number of cycles) for execution of the instructions (S1, S2 and S3) in the instruction threads T1 and T2. An example algorithm of optimizing the number of cycles for execution of instructions is performed by executing the following pseudo-code:

Start T1-S1;
Wait for T1-S1 to complete;
Start T1-S2;
Start T2-S1;
Wait for (T1-S2 or T2-S1) to complete;
If (T1-S2)
Start T1-S3

```
if (T2-S1)
Start T2-S'2
If (!T1-S2) {
Wait for T1-S2
Start T1-S3 }
If (!T2-S1) {
Wait for T2-S1 to complete
Start T2-S'2 };
Wait for T2-S'2 to complete;
Wait for T1-S3 to complete;
Start T2-S3.
```

In the above pseudo-code, if either of the second hardware accelerator engine executing the instruction T1-S2 or the first hardware accelerator engine executing the instruction T2-S1 complete the execution, a next instruction in the instruction threads (either T1 or T2) is dynamically rescheduled for execution (which was otherwise executed as per the initial scheduling in one or more embodiments described with reference to FIG. 3). For example, if the second hardware accelerator engine completes execution of the instruction T1-S2, the processor 102 is configured to schedule the instruction T1-S3 in the third hardware accelerator engine for execution. Alternatively, if the first hardware accelerator engine completes the execution of the instruction T2-S1, the processor 102 is configured to schedule the next instruction (T2-S2) in the execution sequence. In an example, if the instruction T1-S2 is still being executed in the second hardware accelerator engine (if the status of the second hardware accelerator engine is the busy status), the processor 102 schedules the instruction T2-S2 in another hardware accelerator engine (represented by T2-S'2) for the execution of the instruction T2-S2, such as a fourth hardware accelerator engine. The instructions T1-S2 and T2-S'2 are executed in parallel in their respective hardware accelerator engines. In this embodiment, the instruction T2-S3 waits for the completion event from the third hardware accelerator engine executing T1-S3 and the fourth hardware accelerator engine executing T2-S'2. After the reception of completion event from the third hardware accelerator engine and the fourth hardware accelerator engine, the instruction T2-S3 is executed in the third hardware accelerator engine.

Although the above scheduling adopted by the processor reduces the number of cycles taken for the execution of the instructions (S1, S2 and S3) in the instruction threads T1 and T2, it is possible to further optimize the scheduling process by exploiting the parallel execution and using of loops to determine the timing information and schedule the instructions accordingly. It should be noted that the processor 102 is operable to schedule instructions of the multiple instruction threads in multiple hardware accelerator engines by maintaining the execution sequence of the instructions in the multiple instruction threads and following the availability status (that is, resource dependency) of the hardware accelerator engines (for example, first hardware accelerator engine).

Figure 5:
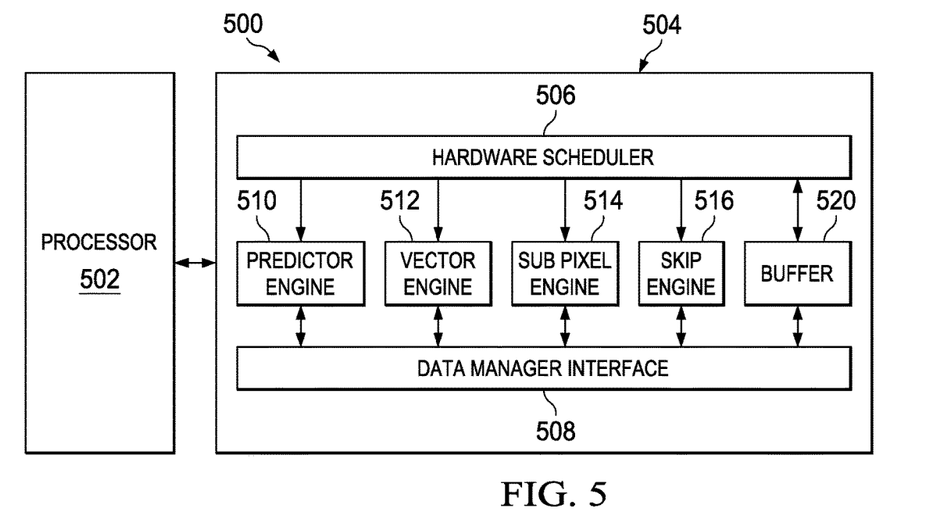
FIG. 5 is a block diagram of an example device including a motion estimation system according to an embodiment.

FIG. 5 is a block diagram of a device 500 used in a motion estimation application between two multimedia frames, such as video frames, according to an example embodiment. The device 500 includes a processor 502 communicatively associated with a motion estimation system 504. The motion estimation system 504 is configured to perform specialised functions such as prediction of matching pixels, matching of pixels between frames, search operations, data macroblock ordering, transformation, sub sampling and other operations for the motion estimation and motion compensation. The processor 502 performs arithmetical and logical operations and transfers operations involving motion estimation to the motion estimation system 504. For example, if a video signal is to be processed for the motion estimation, the processor 502 schedules and transfers instructions associated with the video signal processing to the motion estimation system 504. Herein, the video signal includes any collection of multimedia frames where each frame shows a small change (for example, an object movement between frames) with respect to preceding or succeeding frame.

In an example embodiment, the motion estimation system 504 includes a hardware scheduler 506, a data manager interface 508, a predictor engine 510, a vector engine 512, a sub pixel engine 514, a skip engine 516 and a buffer 520. The hardware scheduler 506 is an example of the hardware scheduler 106 and the buffer 520 is an example of the buffer 112 described with reference to FIG. 1. The description of the hardware scheduler 506 and the buffer 520 is omitted for the sake of brevity.

In an embodiment, the predictor engine 510 is communicatively associated with the hardware scheduler 506 and is configured to execute prediction instructions. In an embodiment, the predictor engine 510 is operable to predict pixel blocks in a frame that are likely to be matching to pixels blocks in another frame. For example, there are two frames F1 and F2, where each frame has a plurality of pixels (for example, 1920*1080 pixels). In an example, for the pixel block, for example a pixel block of 16*16 in the frame F1, a set of pixel blocks (each having a size of 16*16) are predicted in the frame F2, where a pixel block of the set of pixel blocks in the frame F2 is likely to be matching to the pixel block in the frame F1. In an example representation, the frame F1 includes the pixel blocks such as A1, A2 . . . , An, where each of the Ai ('i' is a positive integer between 1 to n) has a fixed number of pixels; and the frame F2 includes pixel blocks such as B1, B2, B3 . . . , Bn, where each of the Bi ('i' is a positive integer between 1 to n) has the fixed number of pixels.

The predictor engine 510 is operable to predict a plurality of first level pixel blocks in the frame F2 that are similar to a pixel block in the frame F1. For instance, the pixel block A5 in the first frame F1 represents a butterfly and the predictor engine is operable to predict a plurality of first level pixel blocks in the frame F2 that are likely to be similar to the pixel block A5 in the first frame F1. For example, the predictor engine 510 predicts that the butterfly appears at any one of the pixel blocks, such as B5, B8, B11, B3, B13, B15 and B19 of the second frame F2. For instance, it is predicted that the butterfly present in the pixel block A5 of the first frame F1 moved to one of the pixel blocks B5, B8, B11, B3, B13, B15 and B19 of the second frame F2. In an embodiment, the predictor engine 510 selects a first candidate pixel block among the plurality of first level pixel blocks (B5, B8, B11, B3, B13, B15 and B19) based on comparison of pixel parameters of the pixel block A5 of the first frame F1 and pixel parameters of each of the pixel blocks B5, B8, B11, B3, B13, B15 and B19 of the second frame F2. For example, the pixel block (A5) in the first frame F1 is compared with the pixel blocks B5, B8, B11, B3, B13, B15 and B19 of the second frame F2 to determine the pixel block that is most similar to the pixel block A5. Examples of pixel parameters include, but are not limited to, color, texture and intensity. In an example, a difference between a pixel parameter of a pixel in the frame F1 and a pixel parameter of a corresponding pixel in the frame F2 is computed, and the difference in the pixel parameters is a metric of the similarity value between the two pixels. For example, if the difference is less, the two pixels are likely to be similar. In an embodiment, sum of absolute differences (SAD) in pixel parameters for the corresponding pairs of pixels between two pixel blocks is calculated to determine the similarity measure (or similarity value) between the two pixel blocks. In an example, the SAD is computed between the pixel block A5 and the pixel blocks B5, B8, B11, B3, B13, B15 and B19. In this example, it is assumed there is the least SAD (for example, having maximum similarity value) between the pixel block A5 and the pixel block B8, and accordingly, the pixel B8 is determined as the first candidate pixel block.

In an embodiment, the vector engine 512 is communicatively associated with the hardware scheduler 506 and is configured to execute vector search instructions. In an embodiment, the vector engine 512 is configured to determine a plurality of second level pixel blocks that are selected from the neighboring pixel blocks of the pixel block B8. For example, the vector engine 512 determines the second level pixel blocks B6, B7, B8, B9, and B10. In an embodiment, the vector engine 512 is configured to determine the pixel block from the pixel blocks B6, B7, B8, B9, and B10 that has the maximum similarity value with the pixel block A5.

In an embodiment, the vector engine 512 is configured to select a second candidate pixel block from among the pixel blocks B6, B7, B8, B9, and B10 that has the least SAD with the pixel block A5. In an embodiment, the second candidate pixel block is determined based on comparison of SADs between the pixel block A5 and each of the pixel blocks B6, B7, B8, B9, and B10. For example, if the SAD between the pixel block A5 and the pixel block B7 is least, the vector engine 512 selects the second level pixel block B7 as the second candidate pixel block.

In an embodiment, the sub pixel engine 514 is communicatively associated with the hardware scheduler 506 and is configured to execute sub pixel search instructions. In an embodiment, the sub pixel engine 514 is configured to interpolate plurality of pixels of the second candidate pixel block (the pixel block B7) and their neighboring pixels to determine a plurality of half pixels. The sub pixel engine 514 is operable to determine a plurality of third level pixel blocks including a combination of the one or more half pixels and one or more of the pixels of the pixel block B7. For example, a plurality of third level pixel blocks B71, B72, B73, B74, B75, B76, B77 and B78 are determined, where each of these pixel blocks have a same number of pixels as in the pixel block A5. In an embodiment, the sub pixel engine 514 determines a third candidate pixel block of the second frame F2 from the plurality of third level pixel blocks that has pixel parameters similar to the pixel block A5 of the first frame (based on the least SAD between the pixel block A5 and each of the pixel blocks B71, B72, B73, B74, B75, B76, B77 and B78). For example, if the sub pixel engine 514 determines that the third level pixel block B76 has the least SAD with the pixel block A5, the pixel block B76 is selected as the matching pixel block for the pixel block A5. It should be noted that the motion estimation algorithm includes further level of interpolations to refine the search process to determine the matching pixel block in the second frame F2 for the pixel block A5 of the first frame F1.

In an embodiment, a skip engine 516 is communicatively associated with the hardware scheduler 506. The skip engine 516 is configured to use the neighboring motion vectors (motion vectors that are already determined for a neighboring pixel block) to predict the motion vector of the current pixel block of the frame, without performing search operation to determine a motion vector for a frame. For example, motion vectors of first frame F1 and second frame F2 are determined by executing instructions in the vector engine 512 and the sub pixel engine 514 as C1 and C2, respectively. In an embodiment, the skip engine 516 predicts the motion vector for a third frame from the motion vectors C1 and C2 of the first frame F1 and the second frame F2. It should be noted that the skip engine 516 is used to predict the motion vector for the third frame assuming a constant global motion between two frames for a moving object. The data manager interface 508 is configured to combine outputs of the predictor engine 510, the vector engine 512, the sub pixel engine 514 and the skip engine 516 after executing the instruction threads in parallel.

In an embodiment, the predictor engine 510, the vector engine 512, the sub pixel engine 514 and the skip engine 516 are configured to operate in parallel. An example of parallel execution of the instruction threads, where each instruction thread includes instructions associated with one or more of the engines 510, 512, 514 and 516, is explained with reference to the following table 1.

TABLE 1

| Time Cycles | Predictor Engine | Vector Engine | Sub pixel Engine | Skip Engine |
|---|---|---|---|---|
| T1 | MBnL0 | | | |
| T2 | MBnL1 | MBnL0 | | MBnL0 |
| T3 | | MBnL1 | MBnL0 | MBnL1 |
| T4 | | | MBnL1 | |
| T5 | MBn + 1 L0 | | | |
| T6 | MBn + 1 L1 | MBn + 1 L0 | | MBn + 1L0 |
| T7 | | MBn + 1 L1 | MBn + 1 L0 | MBn + 1L1 |
| T8 | | | MBn + 1 L1 | |

In an example, a plurality of macro blocks (pixel blocks) are considered in each of the frames for the motion estimation between frames. The size of the pixel blocks vary depending on the application and processing techniques. For example, the size of the pixel block is 8×8, 16×16, 8×16 or 16×8. In an example provided in the Table 1, a motion estimation algorithm is executed for macro block MBn with respect to macro blocks in two directions L0 and L1 (for example, left or right directions, or up or down directions). The processor 502 is operable to create two parallel instruction threads for determining the motion vector for the macro block MBn in the two directions L0 and L1. For example, in a first instruction thread, a first motion vector is determined for the macro block MBn with respect to another macro block in the direction L0; and in a second instruction thread, a second motion vector is determined for the macro block MBn with respect to another macro block in the direction L1. In the example provided in the Table 1, a motion estimation algorithm is also executed for a macro block MBn+1 with respect to macro blocks in two directions L0 and L1. The processor 502 is operable to create two parallel instruction threads for determining the motion vector for the macro block MBn+1 in the directions L0 and L1. For example, in a first instruction thread, a first motion vector is determined for the macro block MBn+1 with respect to another macro block in the direction L0; and in a second instruction thread, a second motion vector is determined for the macro block MBn+1 with respect to another macro block in the direction L1.

In the first T1 cycles, the predictor engine 510 determines a first candidate pixel block for the MBn in L0 direction. In the subsequent T2 cycles, the predictor engine 510 and the vector engine 512 operate in parallel to determine a first candidate pixel block for the MBn in L1 direction, a second candidate pixel block for the MBn in L0 direction, respectively. As shown in the Table 1, during the T2 cycles, the skip engine 516 is operable to execute the skip instruction to determine a skip motion vector associated with MBn in L0 direction. As such, the skip instruction is typically executed independently and does not depend upon the execution of the instructions by the engines 510, 512, 514. Accordingly, the skip engine 516 also executes the skip instruction in the first T1 cycle.

At the subsequent T3 cycle, the vector engine 512 and the sub pixel search engine 514 are configured to operate in parallel and determine a second candidate pixel block associated with the MBn in the L1 direction and a third candidate pixel block associated with MBn in the L0 direction, respectively, where the third candidate pixel block is determined as the matching pixel block for the macroclock MBn in the L0 direction. During the T3 cycle, the skip engine 516 is operable to execute the skip instruction to determine a skip motion vector associated with MBn in the L1 direction. At the subsequent T4 cycle, the sub pixel engine 514 determines a third candidate pixel block associated with MBn in the L1 direction, where the third candidate pixel block is determined as the matching pixel block for the macroblock MBn in the L1 direction.

At the subsequent T5 cycle, the predictor engine 510 determines a first candidate pixel block for the MBn+1 in L0 direction. At the subsequent T6 cycle, the predictor engine 510, the vector engine 512 and the skip engine 516 operate in parallel to determine a first candidate pixel block for the MBn+1 in L1 direction, a second candidate pixel block for the MBn+1 in the L0 direction and a skip motion vector associated with the MBn+1 in the L0 direction, respectively. At the subsequent T7 cycles, the vector engine 512 and the sub pixel search engine 514 are configured to operate in parallel and determine a second candidate pixel block associated MBn+1 in the L1 direction and a third candidate pixel block associated with MBn+1 in the L0 direction, respectively, where the third candidate pixel block is determined as the matching pixel block for the macroclock MBn+1 in the L0 direction. During the T7 cycle, the skip engine 516 is also configured to determine a skip motion vector associated with MBn+1 in the L1 direction. At T8, the sub pixel engine 514 computes a third candidate pixel block associated with MBn+1 in the L1 direction, where the third candidate pixel block is determined as the matching pixel block for the macroclock MBn+1 in the L1 direction.

Figure 6:
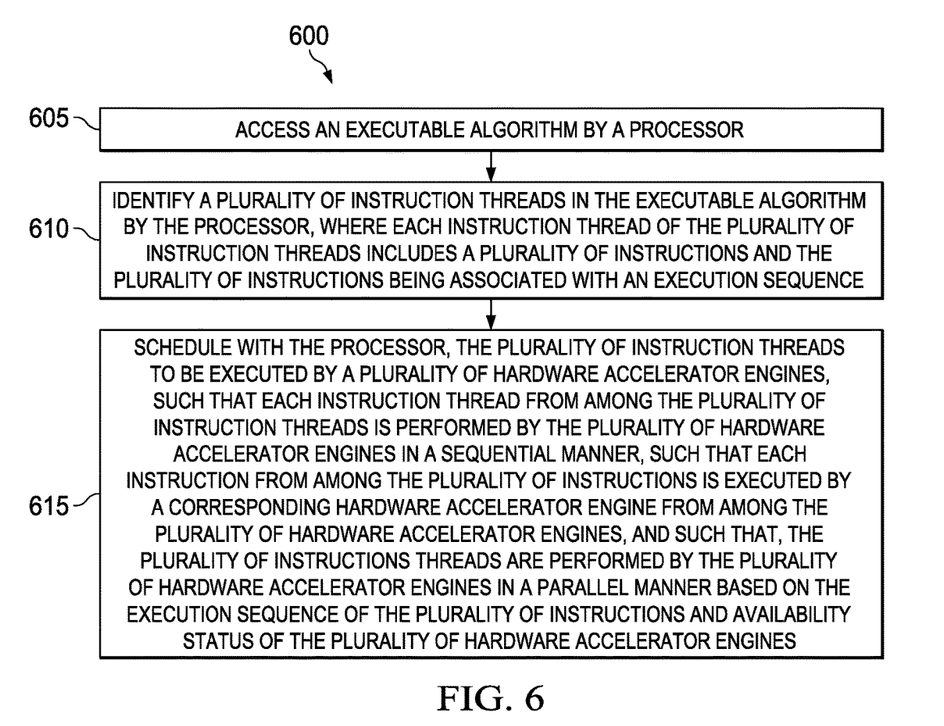
FIG. 6 illustrates a method of executing parallel processing of instruction threads in hardware accelerator engines according to an embodiment.

FIG. 6 illustrates a flow diagram of an example method 600, in accordance with an embodiment. In certain embodiments, operations of the method 600 are performed by a device, such as, for example, the device 100 as shown in FIG. 1 and/or the device 500 shown and explained with reference to FIG. 5.

At block 605, the method 600 includes accessing an executable algorithm by a processor such as the processor 102. Without loss of generality, an example of the executable algorithm is a motion estimation algorithm between two or more media frames.

At block 610, the method 600 includes identifying a plurality of instruction threads in the executable algorithm by the processor. For instance, in case of motion estimation for a frame with respect to the two frames in two directions with respect to the frame, two instruction threads are performed in parallel for determining the motion estimation in both directions. Each instruction thread includes a plurality of instructions that are the same instructions in each of the instruction thread. In an embodiment, the processor determines the instruction threads that are executed in parallel based on a set of operations performed by the instructions threads. For example, the processor receives instructions associated with executing search operations to determine a matching block for a pixel block of a first frame in a second frame and in a third frame. The pixel block of the first frame is compared with pixel blocks in the second frame and with the pixel blocks of the third frame to determine matching blocks. The processor 102 determines that search operations to compute matching blocks of the pixel block of the first frame in the second frame and in the third frame are independent and are executed in parallel. In an embodiment, the processor 102 creates two instruction threads, the first instruction thread includes instructions to determine the matching block for the pixel block of the first frame in the second frame and the second instruction thread includes instructions to determine the matching block for the pixel block of the first frame in the third frame. In an embodiment, the plurality of instructions are associated with an execution sequence. For example, to determine the matching block for the pixel block of the first frame in the second frame, the execution sequence includes executing a predictor search instruction, followed by a vector search instruction and then a sub pixel search instruction in the engines 510, 512 and 514, respectively.

At block 615, the method 600 includes scheduling a plurality of instruction threads to be executed by a plurality of hardware accelerator engines. In an embodiment, the processor 102 is configured to schedule the plurality of instruction threads. For instance, the processor 102 computes execution time associated with executing each instruction in an instruction thread by a hardware accelerator engine and schedules the plurality of instruction threads based on the execution sequence and availability status of the hardware accelerator engines. In an embodiment, the plurality of instruction threads are scheduled such that each instruction thread from among the plurality of instruction threads is performed by a plurality of hardware accelerator engines in a sequential manner based on the execution sequence of the plurality of instructions. For example, to determine the matching block for the pixel block of the first frame in the second frame, the search operation including predictor search, vector search and sub pixel search are executed sequentially.

In an embodiment, each instruction from among the plurality of instructions is executed by a corresponding hardware accelerator engine from among the plurality of hardware accelerator engines. For example, vector search instructions to determine the matching block for the pixel block of the first frame in the second frame is executed in the vector engine, such as the vector engine 512 shown in FIG. 5. In an embodiment, the plurality of instructions threads are performed in a parallel manner based on the availability status of the plurality of hardware accelerator engines. For example, when a hardware accelerator engine executes vector search instructions to determine the matching block for the pixel block of the first frame in the second frame, another hardware accelerator engine is operable to execute predictor search instructions to determine the matching block for the pixel block of the first frame in the third frame. An example of the hardware accelerator engines include the predictor engine 510, the vector engine 512, the sub pixel engine 514 and the skip engine 516 that are shown and explained with reference to FIG. 5. The method 600 further includes merging outputs of the plurality of independent threads associated with the execution of the plurality of instructions.

Without in any way limiting the scope, interpretation, or application of the claims appearing below, effects of one or more of the example embodiments disclosed herein is to provide devices, systems and methods capable of parallel processing in hardware accelerator engines that are coupled with a processor. The scheduling technique exploits parallelism present in the hardware accelerator engines to execute instructions in parallel. The timing information associated with execution of each instruction provided to the processor, improves the performance of the device by scheduling the instructions efficiently. Furthermore, the device is flexible to adapt to different algorithms that system users define for their applications with little modifications to the instructions configured to be executed. It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present technology. Thus, discussions of the features and advantages, and similar language, throughout this specification but do not necessarily, refer to the same embodiment.

Various embodiments of the present disclosure, as discussed above, are practiced with steps and/or operations in a different order, and/or with hardware elements in configurations which are different than those which are disclosed. Therefore, although the technology has been described based upon these example embodiments, it is noted that certain modifications, variations, and alternative constructions are apparent and well within the spirit and scope of the technology.

Although various example embodiments of the present technology are described herein in a language specific to structural features and/or methodological acts, the subject matter defined in the appended claims is not necessarily limited to the specific features or acts described above. Rather, the specific features and acts described above are disclosed as example forms of implementing the claims.

What is claimed is:

1. A device for parallel processing, the device comprising:
   a processor configured to generate a scheduled execution of a plurality of instruction threads, instruction threads of the plurality of instruction threads comprising a plurality of instructions, the plurality of instructions being associated with an execution sequence, the plurality of instruction threads comprising a first instruction thread and a second instruction thread, the first instruction thread comprising a first instruction and a second instruction, and the second instruction thread comprising the first instruction and the second instruction;
   a plurality of hardware accelerator engines configured to perform the scheduled execution of the plurality of instruction threads, the plurality of hardware accelerator engines comprising a first hardware accelerator engine and a second hardware accelerator engine; and
   a hardware scheduler communicatively coupled with the processor and to the plurality of hardware accelerator engines, the hardware scheduler configured to control the scheduled execution such that each hardware accelerator engine of the plurality of hardware accelerator engines is configured to execute a corresponding instruction of the plurality of instructions, such that the first instruction of the first instruction thread is executed by the first hardware accelerator engine, the second instruction of the first instruction thread is executed by the second hardware accelerator engine, the first instruction of the second instruction thread is executed by the first hardware accelerator engine, and the second instruction of the second instruction thread is executed by the second hardware accelerator engine, and such that the plurality of instruction threads are executed by the plurality of hardware accelerator engines in a parallel manner based on the execution sequence and an availability status of each of the plurality of hardware accelerator engines, and wherein the second instruction of the first instruction thread is executed in parallel with the first instruction of the second instruction thread, and after execution of the first instruction of the first instruction thread.

2. The device of claim 1, wherein the processor is further configured to:
   receive timing information associated with execution of instructions of the plurality of instructions by corresponding hardware accelerator engines; and
   reschedule at least one instruction of the plurality of instruction threads based on the timing information.

3. The device of claim 2, wherein the timing information associated with execution of an instruction of the plurality of instructions includes a start time and a completion time associated with the execution of the instruction by a corresponding hardware accelerator engine, wherein the availability status of the hardware accelerator engine is a busy status between the start time and the completion time and is a free status upon completion of the execution of the instruction.

4. The device of claim 2, further comprising a data manager interface communicatively coupled with the plurality of hardware accelerator engines, the data manager interface configured to:
   determine the availability status associated with the plurality of hardware accelerator engines and provide the availability status to the processor; and
   provide the timing information associated with the execution of the instructions of the plurality of instructions to the processor.

5. The device of claim 4, further comprising a buffer communicatively coupled with the hardware scheduler and to the data manager interface, the buffer configured to store data associated with the execution of the plurality of instruction threads by the plurality of hardware accelerator engines.

6. The device of claim 5, wherein the processor is further configured to schedule the plurality of instruction threads based on at least one of an availability status of the buffer or an availability status of the data manager interface.

7. The device of claim 1, wherein the plurality of hardware accelerator engines comprise:
   a predictor engine configured to:
      execute prediction instructions for a pixel block of a first frame, to predict a plurality of first level pixel blocks in a second frame, wherein the plurality of first level pixel blocks are predicted so as to be matching with the pixel block in the first frame, and
      select a first candidate pixel block from among the plurality of first level pixel blocks that has a maximum similarity value with the pixel block of the first frame; a vector search engine configured to:
      execute vector search instructions, for determining a plurality of second level pixel blocks in the second frame based on the first candidate pixel block, and select a second candidate pixel block from among the plurality of second level pixel blocks that has a maximum similarity value with the pixel block of the first frame; and a sub pixel engine configured to:
execute sub pixel search instructions, for determining a plurality of third level pixel blocks in the second frame, wherein pixels of the plurality of third level pixel blocks are determined by interpolating one or more pixels of the second candidate pixel block and one or more neighboring pixels of the second candidate pixel block; and
select a third candidate pixel block of the plurality of third level pixel blocks that has a maximum similarity value with the pixel block of the first frame.

8. The device of claim 7, wherein the plurality of hardware accelerator engines further comprises a skip engine configured to execute a skip instruction for determining a fourth candidate pixel block in the second frame corresponding to the pixel block of the first frame based on an information of a matching pixel block in the second frame corresponding to a neighboring pixel block of the pixel block of the first frame.

9. The device of claim 8, wherein the matching pixel block in the second frame for the pixel block of the first frame is determined among the third candidate pixel block and the fourth candidate pixel block, based on similarity values between the pixel block of the first frame and each of third candidate pixel block and the fourth candidate pixel block.

10. The device of claim 8, wherein a similarity value between the pixel block of the first frame and a pixel block of the second frame is a sum of absolute differences of pixel parameter of corresponding pixel pairs between the pixel block of the first frame and the pixel block of the second frame.

11. A method for parallel processing, the method comprising:
accessing, by a processor, an executable algorithm;
identifying, by the processor, a plurality of instruction threads in the executable algorithm, the instruction threads of the plurality of instruction threads comprising a plurality of instructions, the plurality of instructions being associated with an execution sequence, the plurality of instruction threads comprising a first instruction thread and a second instruction thread, the first instruction thread comprising a first instruction and a second instruction, and the second instruction thread comprising the first instruction and the second instruction; and
scheduling, by a hardware scheduler, the plurality of instruction threads to be executed by a plurality of hardware accelerator engines, such that each instruction of the plurality of instructions is executed by a corresponding hardware accelerator engine of the plurality of hardware accelerator engines, such that the first instruction of the first instruction thread is executed by a first hardware accelerator engine of the plurality of hardware accelerator engines, the second instruction of the first instruction thread is executed by a second hardware accelerator engine of the plurality of hardware accelerator engines, the first instruction of the second instruction thread is executed by the first hardware accelerator engine, and the second instruction of the second instruction thread is executed by the second hardware accelerator engine, and such that, the plurality of instructions threads are performed by the plurality of hardware accelerator engines in a parallel manner based on the execution sequence of the plurality of instructions and an availability status of each of the plurality of hardware accelerator engines, and wherein the second instruction of the first instruction thread is executed in parallel with the first instruction of the second instruction thread, and after execution of the first instruction of the first instruction thread.

12. The method of claim 11, further comprising:
accessing timing information associated with execution of instructions of the plurality of instructions by the processor; and
rescheduling at least one instruction from among the plurality of instructions in the plurality of instruction threads based on at least one of the timing information and the availability status of the plurality of hardware accelerator engines.

13. The method of claim 12, wherein the timing information associated with execution of an instruction of the plurality of instructions includes a start time and a completion time associated with the execution of the instruction by a corresponding hardware accelerator engine, wherein the availability status of the hardware accelerator engine is a busy status between the start time and the completion time and is a free status upon completion of the execution of the instruction.

14. The method of claim 13, wherein scheduling the plurality of instruction threads further comprises:
accessing availability status of a buffer configured to store data associated with the execution of the plurality of instructions threads by the plurality of hardware accelerator engines; and
accessing availability status of a data manager interface, the data manager interface communicatively coupled with the plurality of hardware accelerator engines and configured to determine the availability status of the plurality of hardware accelerator engines and provide the availability status to the processor.

15. The method of claim 11, wherein the plurality of hardware accelerator engines comprise:
a predictor engine configured to:
execute prediction instructions for a pixel block of a first frame, to predict a plurality of first level pixel blocks in a second frame, wherein the plurality of first level pixel blocks are predicted so as to be matching with the pixel block in the first frame, and
select a first candidate pixel block from among the plurality of first level pixel blocks that has a maximum similarity value with the pixel block of the first frame; a vector engine configured to:
execute vector search instructions, for determining a plurality of second level pixel blocks in the second frame based on the first candidate pixel block, and
select a second candidate pixel block from among the plurality of second level pixel blocks that has a maximum similarity value with the pixel block of the first frame; and
a sub pixel engine configured to:
execute sub pixel search instructions, for determining a plurality of third level pixel blocks in the second frame, wherein pixels of the plurality of third level pixel blocks are determined by interpolating one or more pixels of the second candidate pixel block and one or more neighboring pixels of the second candidate pixel block; and select a third candidate pixel block of the plurality of third level pixel blocks that has a maximum similarity value with the pixel block of the first frame.

16. The method of claim 15, wherein the plurality of hardware accelerator engines further comprises a skip engine configured to execute a skip instruction for determining a fourth candidate pixel block in the second frame corresponding to the pixel block of the first frame based on an information of a matching pixel block in the second frame corresponding to a neighboring pixel block of the pixel block of the first frame.

17. The method of claim 16, wherein the matching pixel block in the second frame for the pixel block of the first frame is determined among the third candidate pixel block and the fourth candidate pixel block, based on similarity values between the pixel block of the first frame and each of third candidate pixel block and the fourth candidate pixel block.

18. The method of claim 16, wherein a similarity value between the pixel block of the first frame and a pixel block of the second frame is a sum of absolute differences of pixel parameter of corresponding pixel pairs between the pixel block of the first frame and the pixel block of the second frame.

* * * * *